United States Patent
Petkov et al.

(10) Patent No.: US 9,761,042 B2
(45) Date of Patent: Sep. 12, 2017

(54) METHOD FOR STREAMING-OPTIMIZED MEDICAL RAYTRACING

(71) Applicant: Siemens Healthcare GmbH, Erlangen (DE)

(72) Inventors: Kaloian Petkov, Lawrenceville, NJ (US); Daphne Yu, Yardley, PA (US)

(73) Assignee: Siemens Healthcare GmbH, Erlangen (DE)

(*) Notice: Subject to any disclaimer, the term of this patent is extended or adjusted under 35 U.S.C. 154(b) by 0 days.

(21) Appl. No.: 15/166,720

(22) Filed: May 27, 2016

(65) Prior Publication Data
US 2016/0350963 A1    Dec. 1, 2016

Related U.S. Application Data

(60) Provisional application No. 62/166,959, filed on May 27, 2015.

(51) Int. Cl.
| | | |
|---|---|---|
| *G06T 15/08* | (2011.01) | |
| *G06T 19/00* | (2011.01) | |
| *G06T 15/06* | (2011.01) | |
| *G06T 9/00* | (2006.01) | |
| *H04L 29/06* | (2006.01) | |

(52) U.S. Cl.
CPC ............. G06T 15/08 (2013.01); G06T 9/00 (2013.01); G06T 15/06 (2013.01); H04L 65/4069 (2013.01); H04L 65/602 (2013.01); H04L 65/607 (2013.01); H04L 65/80 (2013.01); *G06T 2210/41* (2013.01); *G06T 2210/52* (2013.01)

(58) Field of Classification Search
CPC .................................................. G06T 2210/41
See application file for complete search history.

(56) References Cited

U.S. PATENT DOCUMENTS

| | | |
|---|---|---|
| 7,154,500 B2 | 12/2006 | Heng et al. |
| 7,184,041 B2 | 2/2007 | Heng et al. |
| 7,330,578 B2 | 2/2008 | Wang et al. |

(Continued)

OTHER PUBLICATIONS

Callahan et al. "Progressive Volume Rendering of Large Unstructured Grids", IEEE Transactions on Visualization and Computer Graphics, vol. 12, No. 5, Sep./Oct. 2006.*

(Continued)

*Primary Examiner* — Saptarshi Mazumder (57) ABSTRACT

A method and apparatus for streaming-optimized volume rendering of a 3D medical volume is disclosed. View parameters for a 2D projection of the 3D medical volume are set based on a received user input. Respective optimal rendering parameters are determined for each of a plurality of rendering stages including an interaction stage, a visual quality refinement stage, and a final assessment stage. In each rendering stage, output 2D projection images corresponding to the view parameters are generated using rendering contexts that perform one or more rendering passes of a progressive volume rendering algorithm on the 3D volume and a display context that composites rendered images generated by the rendering contexts. In each rendering stage, the rendering contexts and the display context are configured using the respective optimal rendering parameters determined for that stage.

27 Claims, 7 Drawing Sheets

(56) References Cited

U.S. PATENT DOCUMENTS

| | | | |
|---|---|---|---|
| 8,253,749 B1 * | 8/2012 | Lichtenbelt | G06F 9/5033 |
| | | | 345/502 |
| 8,954,876 B1 * | 2/2015 | Hobbs | G06F 9/4445 |
| | | | 715/772 |
| 2006/0291710 A1 | 12/2006 | Wang et al. | |
| 2008/0069422 A1 | 3/2008 | Wang et al. | |
| 2008/0158236 A1 * | 7/2008 | Bakalash | G06T 15/005 |
| | | | 345/506 |
| 2009/0154834 A1 * | 6/2009 | Ban | G06T 15/00 |
| | | | 382/284 |
| 2011/0022857 A1 * | 1/2011 | Nussbaum | G06F 1/3203 |
| | | | 713/300 |
| 2012/0154400 A1 | 6/2012 | Steen | |
| 2013/0028492 A1 * | 1/2013 | Dorn | G06T 1/60 |
| | | | 382/128 |
| 2014/0267288 A1 * | 9/2014 | Smyth | G06T 17/005 |
| | | | 345/440 |

OTHER PUBLICATIONS

Chang et al. "LDI Tree: A Hierarchical Representation for Image-Based Rendering", SIGGRAPH 99, Los Angeles, CA USA Copyright ACM 1999.*

Kroes, Thomas, et al., "Exposure Render: An Interactive Photo-Realistic Volume Rendering Framework," Plos One, Jul. 2, 2012, 11 pages, vol. 7, retrieved from http://http://journals.plos.org/plosone/article?id=10.1371/journal.pone.0038586.

* cited by examiner

METHOD FOR STREAMING-OPTIMIZED MEDICAL RAYTRACING

This application claims the benefit of U.S. Provisional Application No. 62/166,959, filed May 27, 2015, the disclosure of which is herein incorporated by reference.

BACKGROUND OF THE INVENTION

The present invention relates to volume rendering of medical volumetric data, and more particularly, to streaming-optimized progressive distributed volume rendering of medical volumetric data.

Volume rendering refers to generating and displaying 2D projection images of a 3D volumetric data set. Volume rendering is often applied to 3D medical volumes, such as computed tomography (CT) or magnetic resonance imaging (MRI) volumes, to generate 2D projection images. Ray tracing is a rendering technique in which a 2D projection image is generated by tracing the path of light through pixels in an image plane and simulating the effects of its encounters with virtual objects. Distributed ray tracing is typically performed progressively by averaging images generated by tracing a large number of light paths to create a final rendered image. Ray tracing is capable of producing very high-quality 2D images, but at a high computational cost.

A major challenge for a computationally intensive ray tracing rendering pipeline for medical image visualization is that in order to maintain certain interactivity and low latency sufficient for medical evaluation, it is often necessary to present lower quality, intermediate rendering results from a progressively rendered pipeline to the user. In a progressively rendered ray tracing pipeline, many iterations or rendering passes must be combined to produce the final high-quality image. The number of passes needed is highly dependent on the medical data and the selected settings, such as the set of supported visual effects and various viewing parameters. For example, the result of tracing a single light path from the viewing camera, through the medical data and to the light sources, may produce a very noisy image, and hundreds of light paths per pixel may be required to generate a noise-free image. Since the system must maintain a high frame rate during user interaction, the user experiences very distracting image noise that is resolved progressively only when the user interaction stops. This has a particularly significant effect when the system implements remote interaction, where the images are further streamed to a remote terminal. In this scenario, the noisy images can be further degraded by the compression algorithm used in the image transport. For example, for video based compression, this results in very large peaks in the video streaming bandwidth, or alternatively, in significant compression artifacts that are only resolved during idle-time refinement.

BRIEF SUMMARY OF THE INVENTION

The present invention provides a method and system for streaming-optimized volume rendering of medical volumetric data. Embodiments of the present invention provide a method and system for progressive distributed rendering with minimal visual artifacts during user interaction.

In one embodiment of the present invention, view parameters for a 2D projection of the 3D medical volume are set based on a received user input. Respective optimal rendering parameters are determined for each of a plurality of rendering stages. Output 2D projection images corresponding to the view parameters are generated in each of the plurality of rendering stages by: performing, by each of one or more rendering contexts, one or more rendering passes of a progressive volume rendering algorithm on the 3D volume, to generate a respective rendered image, and compositing, by a display context, the rendered images generated by the one or more rendering contexts. In each respective one of the plurality of rendering stages, the one or more rendering contexts and the display context are configured using the respective optimal rendering parameters determined for that rendering stage.

These and other advantages of the invention will be apparent to those of ordinary skill in the art by reference to the following detailed description and the accompanying drawings.

DETAILED DESCRIPTION

The present invention relates to a method and system for streaming-optimized volume rendering of medical volumetric data. Embodiments of the present invention are described herein to give a visual understanding of the volume rendering method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Volume rendering refers to generating and displaying 2D projection images of a 3D volumetric data set. Embodiments of the present invention provide a method and system for progressive distributed ray tracing volume rendering with minimal artifacts during user interaction. As opposed to some existing approaches, embodiments of the present invention utilize the same rendering algorithm (with different parameters) during both interaction and final render, thus avoiding major changes to lighting and overall appearance during interaction, and the system performance scales automatically to the underlying computational resources. Some categories of existing approaches cache and reuse old rendered samples or old lighting computations. In contrast, embodiments of the present invention produce images that are free from temporal artifacts, and invalidated results are not used in subsequent computations.

Figure 1:
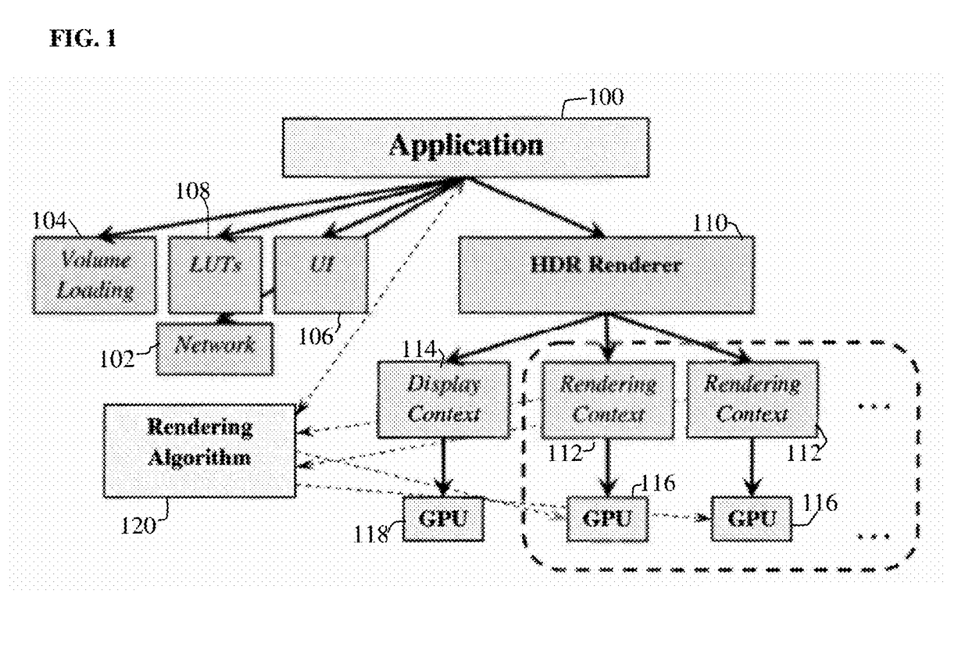
FIG. 1 illustrates a system architecture of a rendering application 100 according to an embodiment of the present invention.

FIG. 1 illustrates a system architecture of a rendering application 100 according to an embodiment of the present invention. The rendering application 100 can be implemented on one or more computers using computer processors, memory units, storage devices, computer software, and other components. In an advantageous embodiment, the rendering application 100 can be implemented on a network-based cloud computing system in order to perform volume rendering in the cloud computing system and stream images resulting from the volume rendering to a remote terminal, at which the rendered images are displayed. The architecture of the rendering application 100 may be implemented on a single computer device or distributed over multiple computer devices in the network-based cloud computing system. In an alternative embodiment, the rendering application 100 can be implemented on the same device at which the rendered images are displayed.

The rendering application 100 communicates with a remote terminal via a network 102. The network 102 can be any type of data network, such as the Internet. A volume loading module 104 loads 3D medical volumes, such as CT volumes, MRI volumes, etc., via the network 102. For example, the volume loading module 104 can load a 3D medical volume from the remote terminal, a database, or directly from an image acquisition device (e.g., CT or MRI scanner) via the network 102.

The rendering application includes a user interface (UI) 106. The UI 106 is displayed at the remote terminal via the network 102 and receives user input entered via a user input device (e.g., mouse, touch screen, etc.) at the remote terminal. The UI 106 can provide a display of the rendered images at the remote terminal, as well as controls to enable a user to interact with the rendering application 100. For example, a user can use the UI 106 to control viewing parameters related to the rendered image, such as a position of the virtual camera, a direction of viewing or projection angle, and cinematic parameters, such as aperture size, exposure settings, etc. The UI 106 may also enable the user to select from visual effects supported by the rendering algorithm 120, such as simulation of reflection and refraction, scattering, and dispersion phenomena.

The rendering application 100 includes look-up tables (LUTs) 108, which map values obtained by the medical scanner to optical properties that can be utilized for generating the 2D projection of the data. In order to perform volume rendering, the opacity and color must be defined for each voxel in a medical volume. An RGBA (red, green, blue, alpha) transfer function can be used to define RGBA values for each possible voxel value. The LUTs 108 can include look-up tables that provide the RGBA values resulting from such a transfer function for each possible voxel value. Accordingly, when the volume rendering algorithm 120 is being executed by the rendering application 100, the rendering application 100 retrieves the RGBA values corresponding to the voxels in the volume from the LUTs 108. The LUTs 108 may also include look-up values for other parameters related to the volume rendering as well. In some embodiments, the LUTs 108 may be stored remotely with respect to other components of the rendering application 100, and the rendering application may access the LUTs 108 via the network 102.

A renderer 110 controls the volume rendering according to a rendering algorithm 120. In an advantageous implementation, a high dynamic range (HDR) renderer 110 is used to implement HDR rendering. In an advantageous embodiment, the Monte-Carlo ray tracing algorithm can be used as the rendering algorithm 120, and a global illumination renderer is utilized for rendering medical volumetric data using Monte-Carlo ray tracing. However, the present invention is not limited to Monte-Carlo ray tracing, and other distributed ray tracing algorithms may be used as well.

Monte-Carlo ray tracing (also referred to a "path tracing") renders a 3D scene by randomly tracing samples of possible light paths. Repeated sampling of any given pixel will eventually cause the average of the samples to converge on the correct solution of the rendering equation. The Monte Carlo ray tracing algorithm integrates the illuminance arriving at a given location on the surface of an object or within the medical data, based on a configuration of virtual light sources. A surface reflectance function (BRDF) then determines the amount of light reflected toward the viewpoint camera based on material characteristics. This integration procedure is repeated for every pixel in the output image. The Monte Carlo ray tracing algorithm samples random light paths through the 3D volume and can thus capture complex lighting effects and sophisticated camera models. Due to the stochastic nature of the Monte-Carlo ray tracing algorithm, many complex light paths inside the volume are considered and form a smooth, photo-realistic image over time. In a possible implementation, the Monte-Carlo ray tracing algorithm yields a high dynamic range estimate of light arriving at the image plane of the virtual camera. This stochastic raycasting evaluates a thin lens camera model, which incorporates a finite aperture and models a real-world camera. Camera rays are constructed by sampling a point on the lens and sampling a perturbed point within the finite area of a pixel on the image plane of the virtual camera with stratified sampling. The rays are intersected with the 3D volume's bounding box, yielding a parametric range of rays. Rays that do not intersect with the 3D volume are discarded. In a possible implementation, Woodcock tracking may be used to determine where scattering events occur within the 3D volume for each ray. The Monte-Carlo ray tracing algorithm may then filter each estimate of light arriving at the image plane, for example using a separable Gaussian kernel, in order to reduce aliasing. The Monte-Carlo path tracing algorithm then performs Monte-Carlo integration by computing the cumulative moving average of sampling positions over the N light transport paths, resulting in an estimate of the incident light on the image plane of the virtual camera. In an exemplary implementation, the estimate of incident light on the image plane of the virtual camera for a particular viewing/projection angle can be calculated by averaging all light contributions to each pixel $I_i$ on the image plane of the virtual camera from sampling positions on N light transport paths as $$I_i = \frac{1}{N} \sum_{j=1}^{N} \frac{f_i(C_j)}{p(X_j)},$$

where i refers to the pixel on the image plane of the virtual camera, j refers to the light transport path, $f_i(C_j)$ is the light being transported along the particular path for lighting $C_j$ coming from a light source at the end of the path, and $p(X_j)$ is the probability for the path $X_j$. This Monte-Carlo integration procedure produces a smooth image for a large N. An anisotropic noise filter can then be applied to the final estimate at every iteration. A plurality of estimates can be averaged for a particular camera position θ (i.e., projection angle) to get the corresponding 3D projection image.

The renderer 110 controls one or more rendering contexts 112 and a display context 114 in order to implement the volume rendering application 100. Each rendering context 112 is a wrapper that exposes the computational capabilities of a single device (e.g., GPU 116) to the main renderer 110 and accesses a shared rendering algorithm 120. Each rendering context 112 performs operations including allocation/deallocation of rendering resources, data processing and upload to device memory, and interaction with other components of the rendering application 100. Each rendering context 112 performs a single render pass, which traces 1 or more light rays per render element (e.g., for each pixel of a projection image for a particular viewing angle) by invoking the rendering algorithm 120. A single render pass for each of the rendering contexts 112 results in a separate 2D image generated by each render context 112. Different ones of the rendering contexts 112 may perform the render pass at different resolutions, resulting in multiple images computed at multiple resolutions. Each rendering context 112 also performs read-back and processing of rendering results from device memory, as well as accelerated hardware-specific communication with other rendering contexts 112 and the display context 114.

The display context 114 performs the compositing functionality of the renderer 110 to integrate the 2D images generated by the rendering contexts 112 into a single image. The display context 114 implements the compositing functionality defined in the rendering algorithm 120 in order to seamlessly integrate multiple images computed at multiple resolutions by the rendering contexts 112 into a single image. In an exemplary embodiment in which the system architecture is deployed on a low powered device, the compositing can be performed by the display context 114 using hardware-specific image resizing with minimal filtering. In another embodiment, the display context 114 can employ high-order spatial and temporal filtering to integrate the multiple rendering context 112 image results into the final image. As used herein, the singular update of the output image by the display context 114 is referred to as a singular display pass.

In one embodiment, the display context 114 is implemented on a computer device other than the device at which the output image is displayed. For example, the display context 114 may be implemented on computer device in a network-based cloud computing system which streams the output image to a remote terminal. In this case, the display context 114 employs hardware-specific functionality to capture, compress, and stream the final image to the remote terminal. In another embodiment, the display context 114 can be implemented directly on the display device. In this case, the display context 114 composites and displays the final image.

In one embodiment, a plurality of rendering contexts 112 are deployed over dedicated rendering devices (e.g., GPUs 116). In particular, as shown in FIG. 1, each of the plurality of rendering contexts 112 is deployed using a respective dedicated graphics processing unit (GPU) 116. In addition, in the embodiment of FIG. 1, the display context 114 is deployed on a dedicated GPU 118. In an advantageous implementation, in order to perform rendering with different parameters optimized for different stages of the rendering process, a first subset of rendering contexts 112 and dedicated rendering devices is selected to perform rendering passes during an interaction stage, a second subset of rendering contexts 112 and dedicated rendering devices is selected to perform rendering passes during a final render stage, and a single-device subset (e.g., GPU 118) is selected for the display context 114. Hardware-specific memory transfer is used to move the image results from the rendering devices (e.g. GPUs 116) to the display device (e.g., GPU 118). Example configurations include high-end workstations or servers with 1-8 dedicated rendering GPUs 116 and a single low-power dedicated GPU 118 for compositing and display.

In another embodiment, the display context and rendering context can utilize the same hardware device, using hardware-specific functionality to share data between the contexts. Examples configurations for this embodiment include single GPU-devices, a cloud-based GPU device, and CPU-based renders. In yet another embodiment, an asymmetric configuration can be deployed with one hardware device (e.g., GPU) shared by a rendering context and a display context and one or more additional devices (e.g., GPUs) each with a dedicated rendering context. Hardware-specific accelerated memory transfer is used to share the image results from the dedicated device(s) with the shared device. Example configurations for this embodiment include dual-GPU workstations.

Figure 2:
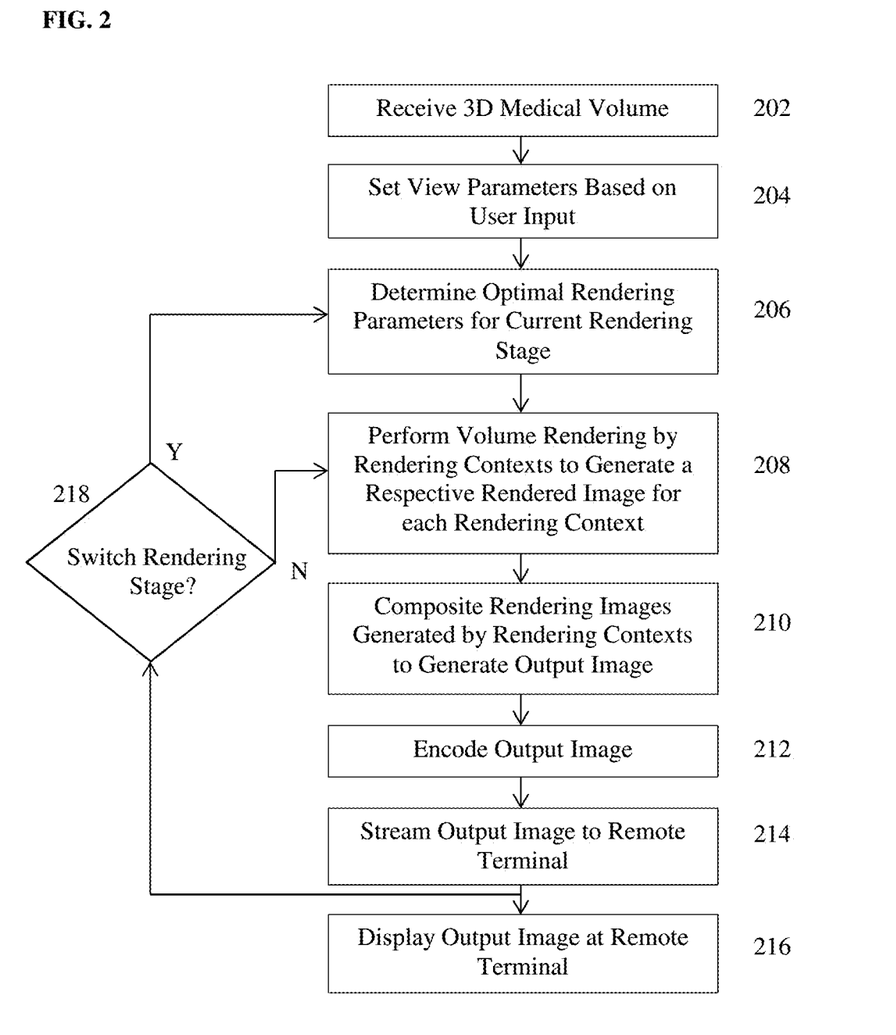
FIG. 2 illustrates a method for streaming-optimized volume rendering according to an embodiment of the present invention.

FIG. 2 illustrates a method for streaming-optimized volume rendering according to an embodiment of the present invention. The method of FIG. 2 transforms a 3D medical volume representing anatomy of a patient to generate rendered 2D projection images from the 3D medical volume. Referring to FIG. 2, at step 202, a 3D medical volume is received. The 3D medical volume can be a 3D medical volume of a patient acquired using any type of medical imaging modality, such as computed tomography (CT), magnetic resonance imaging (MRI), dynaCT, ultrasound (US), positron emission tomography (PET), etc. The 3D medical volume can be received by loading the 3D medical volume from a remote terminal or database via network, loading the 3D medical volume from a memory or storage of a computer system, or receiving the 3D medical volume directly from an image acquisition device, such as a CT scanner, MRI scanner, etc.

At step 204, view parameters are set based on user input. User input can be received via a user interface that specifies view parameters such as position of a virtual camera and a viewing angle (i.e., direction of viewing). In addition to the position of a virtual camera and viewing angle, other view parameters including cinematic parameters, such as aperture size and exposure setting, and visual effects, such as simulation of reflection and refraction, scattering, and dispersion phenomena, may be specified by the received user input. The view parameters are then set to define a virtual camera that will be used to simulate how light interacts with the scene in the 3D volume in order to perform volume rendering. It is to be understood that a user input may not be received for all of the above listed parameters and predetermined default parameters may be used for all parameters that were not specified by the user input. For example, a user may only specify the viewing angle, and default parameters may be used for the camera position, cinematic parameters, and visual effects parameters.

At step 206, optimal rendering parameters for a current rendering stage are determined. According to an advantageous embodiment, rendering parameters that control the volume rendering by the rendering contexts 112 (step 208) and the compositing of rendered images by the display context 114 (step 210) are optimized to achieve different goals for different ones of a plurality of rendering stages. The rendering stages include an interaction stage, in which a user is interacting with the rendered images to explore the image data and obtain an optimal view, a visual quality refinement stage, in which an image resulting from the interaction stage is iteratively refined to improve the image quality, and a final assessment stage. The rendering parameters that are optimized can include resolution of the rendered image, the number of rendering passes performed by rendering contexts for each display pass (i.e., before the resulting images are composited by the display context), the number of rendering contexts and subset of rendering devices (e.g., GPUs) to perform parallel rendering passes, and/or parameters controlling the interaction between the display context and the rendering contexts. In various embodiments, the rendering parameters are selected to optimize a framerate for streaming/displaying the rendered images, the memory bandwidth between the display context and the rendering contexts, the image quality, and/or the computational throughput depending on the stage for which the rendering parameters are being selected. The determination of the optimal rendering parameters for the different rendering stages is discussed in greater detail below.

At step 208, volume rendering is performed by one or more rendering contexts to generate a respective rendered image for each of the rendering contexts. In an advantageous embodiment, a plurality of rendering contexts are deployed on a respective plurality of dedicated rendering devices GPU running in parallel to generate a respective plurality of rendered images. In this step, each rendering context can progressively iterate the ray tracing volume rendering and the resulting rendered images from that rendering context averaged to produce increasingly refined images. In particular, N rendering passes are performed by each rendering context before the resulting rendered images are composited by the display context and presented to the user. A smaller value of N shows more immediate results, and a larger value of N provides more refined images having a higher image quality. The value of N and the resolution of the rendered images can be selected according to the rendering phase in step 206. In addition, the number of rendering contexts and the subset of rendering devices (GPUs) dedicated to the rendering contexts can be selected according of the rendering phase in step 206.

At step 210, the rendered images generated by the rendering contexts are composited by the display context to generate an output image. The output image provides the final image rendering result for a particular display pass. When the multiple rendering device configuration is used, this step composites the resulting rendered images from multiple rendering devices (e.g., GPUs) running in parallel. The display context may employ hardware-specific image resizing with minimal filtering or may employ high-order spatial and temporal filtering to integrate the multiple rendered images generated by the rendering contexts into a single combined output image. When this step is repeated for multiple times at the same view parameters, e.g., in the visual quality refinement stage and/or the final assessment stage, the composite image resulting from integrating the multiple rendered images generated by the rendering contexts can be blended smoothly with the previous output image result to generate an output image that provides a progressive refinement to the previous output image.

At step 212, the output image is encoded. The output image is encoded to compress the image into a format for streaming to a remote terminal. Various known encoding techniques may be used. In one embodiment, the display context is configured to capture and compress the image data into an H.264 video stream. In an exemplary implementation, a high quality encoding configuration may be used with 4:4:4 chroma subsampling (i.e., no downsampling of the color information), single pass encoding, and an emphasis on image quality over latency. In another exemplary implementation, a low latency encoder configuration may be used with 4:2:0 chroma subsampling. At step 214, the encoded output image is streamed to the remote terminal via a data network. A sequence of output images generated by repeating steps 208-212 may be streamed to the remote terminal as a video stream. At step 216, the output image is displayed at the remote terminal. A user may then interact with the displayed output image using a user interface, for example to explore the image data (e.g., rotating, scrolling, windowing, etc.) and change the view parameters. The method of FIG. 2 describes an embodiment in which the output image is streamed to a remote terminal. It is to be understood that the present invention is not limited thereto, and in an embodiment in which the display context is implemented on the device that displays the output image, the output image can be directly displayed on the display device without the encoding and streaming steps 212 and 214.

At step 218, it is determined whether the current rendering stage has switched. When a user input changing the view parameters is received, the current rendering stage is determined to be in the interactive stage. When the user interaction stops and the view parameters are no longer changed, the rendering stage enters the visual quality refinement stage. For example, the current rendering stage may be determined to switch from the interactive stage to the visual quality refinement stage if an amount of time greater than a predetermined threshold has passed since a user input that changes the view parameters has been received. In one exemplary implementation, the current stage can switch from the visual quality refinement stage to the final assessment stage after a predetermined number of display passes are performed at the visual quality refinement stage. Each iteration through steps 208-210 is considered to be a display pass, and in the visual quality refinement stage, each display pass refines the displayed output image. In another exemplary implementation, the current stage can switch from the visual quality refinement stage to the final assessment stage after a predetermined amount of time has passed in the visual quality refinement stage. In another exemplary implementation, a difference metric can be calculated between the output image after each display pass and the output image from the previous display pass, and the current stage can switch from the visual quality refinement stage to the final assessment stage when the error value is less than a predetermined threshold. If at any point in the visual quality refinement stage or in the final assessment stage, a user input is received that changes the view parameters, the current stage switches back to the interactive stage again. If it is determined at step 218 that the current stage has not switched, the method returns to step 208 and steps 208-218 are repeated with the same optimal rendering parameters previously calculated for the current stage. It is to be understood that if the current rendering stage remains in the interactive stage, new view parameters may be set based on the user interaction, and steps 208-218 are repeated using the new view parameters. If it is determined at step 218 that the current stage has switched, the method returns to step 206, at which optimal rendering parameters are determined for the new current rendering stage, and then steps 208-218 are repeated with the optimal rendering parameters determined for the new current rendering stage. It is to be understood that if the current rendering stage has switched back to the interactive stage from one of the other stages, new view parameters may be set based on the user interaction, and steps 208-218 are repeated using the new view parameters as well as the optimal rendering parameters determined for the new current rendering stage.

In the method of FIG. 2, the optimal rendering parameters for a current rendering stage are determined by repeating step 206 whenever the rendering stage switches from one rendering stage to another. In an alternative implementation, the optimal rendering parameters can be determined once for all of the rendering stages (e.g., the interaction stage, the visual quality refinement stage, and the final assessment stage), and then the rendering and compositing steps be performed according to the rendering parameters of the current rendering stage.

Figure 3:
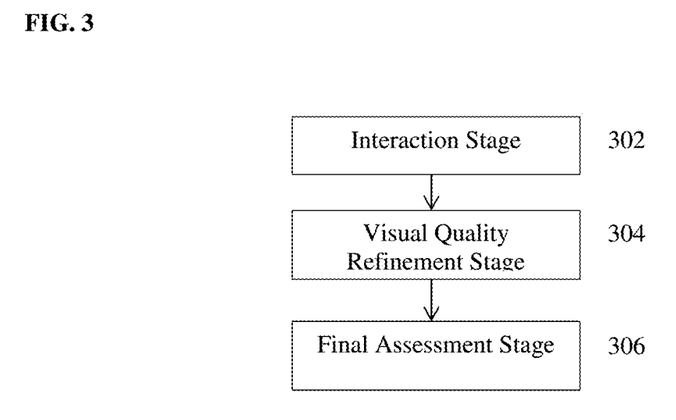
FIG. 3 illustrates rendering stages for which rendering parameters are optimized according to an embodiment of the present invention.

FIG. 3 illustrates rendering stages for which rendering parameters are optimized according to an embodiment of the present invention. As illustrated in FIG. 3, the rendering stages include the interactive stage 302, the visual quality refinement stage 304, and the final assessment stage.

During the interactive stage 302, in which a user is interacting with the rendered images to explore the image data and obtain an optimal view, sufficient interactivity and image quality to assess the view is required. During the user interaction stage 302, the rendering algorithm is configured with a set of application specific reduced-quality parameters and a pre-specified number of render passes are accumulated before the display pass. The specific combination of parameter can depend on the type of interactivity, such as rotation, scrolling, or windowing, as well as the deployment configuration and data size.

In one embodiment, the rendering parameters for the interaction stage 302 are set to configure the rendering contexts to generate images at reduced resolution for fixed number (N>1) of rendering passes, and the resulting rendered images are then upsampled and composited by the display context. The display context may employ native image interpolation from the rasterization pipeline or a custom upsampling filter in order to upsample the low resolution rendered images. Accordingly, in an advantageous implementation, for the interaction stage 302, the resolution of the rendered images generated by the rendering contexts is reduced, resulting in lower resolution images in the interaction stage 302, and the number of rendering passes, N, is set such that a plurality of rendering passes are performed by each rendering context before the display pass to progressively refine each respective rendered image prior to compositing the rendered images into an output image and displaying the output image. This results in an output image with low resolution, but also low noise. Since a plurality of rendering passes are performed before the display pass in the interaction stage 302, when a user input is received specifying or changing the view parameters, each pixel in each of the rendered images that are combined to generate the output image is rendered multiple times before the output image is displayed as the first frame at the current viewing parameters.

In another embodiment, the rendering parameters for the interaction stage 302 are automatically set based on a target framerate for streaming/displaying the output images resulting from the image rendering. In particular, a target framerate is specified for the user interaction stage 302, and the rendering parameters, such as the resolution of the rendering images and the number of rendering passes for the display pass, are automatically varied to find the optimal rendering parameters that achieve the target framerate. The relative frequency and step size for changing a given rendering parameter is dependent upon the hardware configuration.

For example, changing the rendering resolution on a GPU device is relatively expensive since it involves GPU memory reallocation, and therefore, it may be adapted less often then the number of rendering passes per display pass.

In another embodiment, the available memory bandwidth between display context and the rendering contexts may be measured in order to select an optimal subset of rendering devices to be used for the interaction stage 302. This is particularly advantageous for multi-processor configurations where, depending on the system topology, accelerated GPU-to-GPU communications may not be supported for GPUs connected to different processors. In such configurations, the system may select only GPU rendering devices connected to the same bus as the display device. As an example, modern dual-processor/quad-GPU configurations may achieve higher performance when using the two GPUs connected to the first processor during the interaction stage 302 and all four GPUs for the final render in the subsequent stages 304 and 306.

In embodiments without a dedicated GPU for the display context, configurable throttling may be employed on the shared GPU device in the interaction stage 302 so that sufficient GPU time is available for the user interface, image capture and streaming, or additional 3D applications. GPU throttling in the interactive stage 302 is disabled for rendering contexts with dedicated computational devices (e.g., dedicated GPUs). Alternatives to throttling may be used where applicable, including asynchronous shading and pixel-level context pre-emption.

When the user interaction stops and the viewing parameters are no longer being changed, the rendering stage switches from the user interaction stage 302 to the visual quality refinement stage 304. In the visual quality refinement stage 304, the task is to further assess details to ensure a proper selection of the data view, and refinement of the image quality of the selected view becomes the system focus. Accordingly, in the visual quality refinement stage 304, the output image for a particular view resulting from the interaction stage 302 is iteratively refined to improve the image quality. Since each display pass in the visual quality refinement stage 304 refines the previous output image, each display pass can also be referred to as a refinement pass. In the visual quality refinement stage 304, a number of refinement passes are rendered with rendering parameters optimized for fast visual feedback and high resolution. The visual quality refinement stage 304 may include a predetermined number of refinement passes (i.e., display passes) or more run for a predetermined amount of time before switching to the final assessment stage 306. Alternatively, the visual quality refinement stage 304 may run until a difference metric between the output image and the previous output image is less than a predetermined threshold. In one embodiment, the rendering parameters for the visual quality refinement stage 304 are optimized for fast visual feedback by reducing GPU throttling (if GPU throttling was employed in the interaction stage), and setting the rendering parameters such that the rendering contexts are configured to perform one rendering pass (N=1) per refinement step and the display context interacts with only a single non-shared external render context at a time for each display pass. This allows refinements due to additional images being rendered to be shown on the image being displayed as soon as each additional image is rendered. During refinement, the output image is blended smoothly with the image result from the interaction stage 302. In addition, the rendering parameters can be set such that the resolution of the rendered images in the visual quality refinement stage 304 is increased to a higher resolution, as compared with the resolution of the rendered images in the interaction stage 302.

In the final assessment stage 306, the system focuses on high throughput to the rendering engine, such that the final quality image can be produced as quickly as possible. The rendering parameters for the final assessment stage 306 are set such that each render context performs multiple rendering passes per refinement step and interacts with the display context less often in order to reduce the usage of the limited GPU-to-GPU bandwidth. In one embodiment, the frequency of the memory transfers from the rendering contexts to the display context is adapted automatically until the memory transfer cost does not affect the computational throughput of the system significantly. In another embodiment, the frequency of the memory transfers from the rendering contexts to the display context is set to be a fraction of the display pass frequency and the display context interacts with up to one non-shared render context per display pass. Additional rendering parameters (e.g., rendering resolution) may be changed in the final assessment stage, compared to the visual quality refinement stage.

Figure 4:
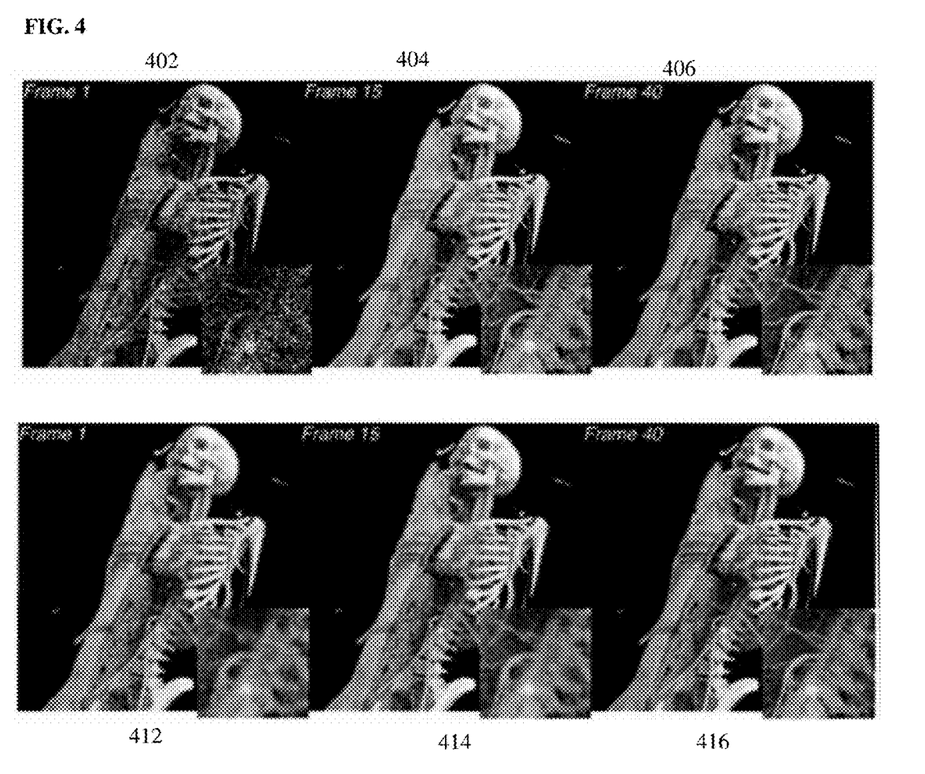
FIG. 4 illustrates exemplary volume rendering results.

FIG. 4 illustrates exemplary volume rendering results. As shown in FIG. 4, images 402, 404, and 406 show frames 1, 15, and 40, respectively, of a rendering frame progression generated from a 3D volume using a conventional volume rendering technique, and images 412, 414, and 416 show frames 1, 15, and 40, respectively, of a rendering frame progression generated from the same 3D volume using the streaming-optimized volume rendering method according to an embodiment of the present invention. Compared to the results of the convention volume rendering technique, the image 412 acquired during interaction using the streaming-optimized volume rendering is a faithful representation of the data at a lower spatial resolution, and it is virtually noise free in the tested configuration. After the visual quality refinement stage, the rendering results generated using the streaming-optimized volume rendering is virtually identical to those achieved using the conventional refinement technique.

Figure 5:
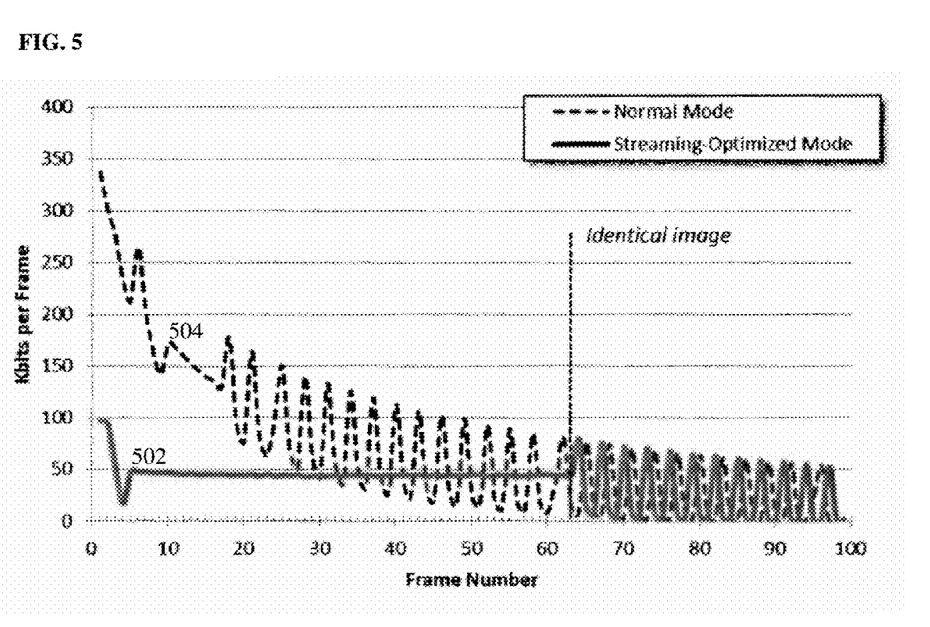
FIG. 5 illustrates the per-frame streaming bandwidth of the streaming-optimized volume rendering method and a conventional volume rendering technique using high quality compression.
Figure 6:
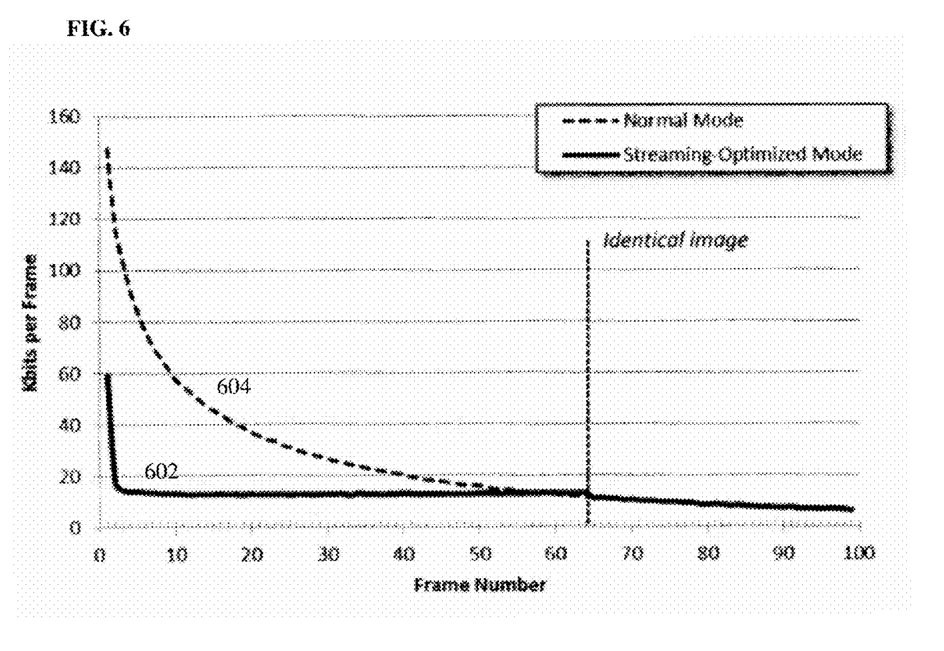
FIG. 6 illustrates the per-frame streaming bandwidth of the streaming-optimized volume rendering method and a conventional volume rendering technique using low latency compression.

FIGS. 5 and 6 illustrate effects of the streaming-optimized volume rendering method on streaming performance. The effects of the streaming-optimized volume rendering method were evaluated on streaming performance, where the display context is configured to capture and compress image data into an H.264 video stream. FIG. 5 illustrates the per-frame streaming bandwidth of the streaming-optimized volume rendering method 502 and a conventional volume rendering technique 504 using high quality compression. The high quality compression uses an encoding configuration with 4:4:4 chroma subsampling (i.e., no downsampling of the color information), single pass encoding with a constant quantization parameter, and emphasis on image quality over latency. As shown in FIG. 5, the peak bit-rate is significantly lower with the streaming-optimized volume rendering method 502 than with the conventional volume rendering technique 504. The local peaks in the graph correspond to I-Frames in the video bitstream. FIG. 6 illustrates the per-frame streaming bandwidth of the streaming-optimized volume rendering method 602 and a conventional volume rendering technique 604 using low latency compression. The low latency compression uses an encoding configuration with 4:2:0 chroma subsampling, which more closely resembles real-world interactive remote viewing configurations. As shown in FIG. 6, the low noise images produced using the streaming-optimized volume rendering method 602 again show much more effective compression with reduced I-Frame peaks and lower overall bandwidth consumption, as opposed to the convention volume rendering technique 604.

Figure 7:
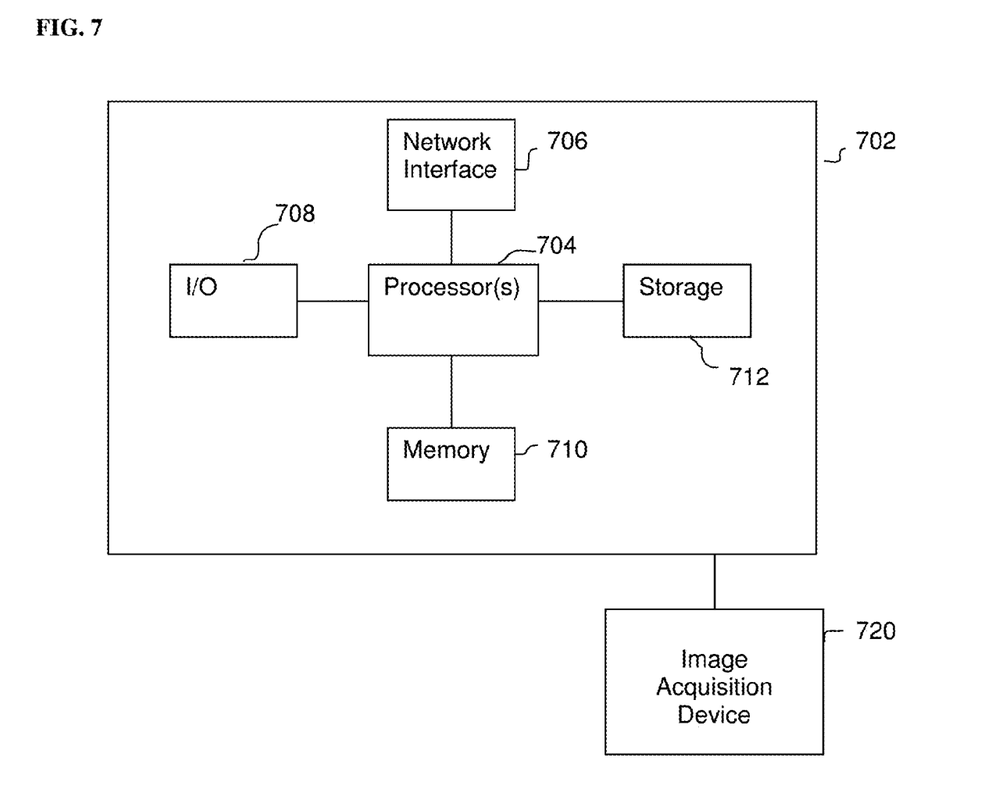
FIG. 7 is a high-level block diagram of a computer capable of implementing the present invention.

The above-described methods for streaming-optimized volume rendering may be implemented on one or more computers using well-known computer processors, memory units, storage devices, computer software, and other components. A high-level block diagram of such a computer is illustrated in FIG. 7. Computer 702 contains one or more processors 704, which control the overall operation of the computer 702 by executing computer program instructions which define such operation. The processors 704 may include one or more central processing units (CPUs) and one or more graphics processing units (GPUs). The computer program instructions may be stored in a storage device 712 (e.g., magnetic disk) and loaded into memory 710 when execution of the computer program instructions is desired. Thus, the steps of the methods of FIGS. 2 and 3 may be defined by the computer program instructions stored in the memory 710 and/or storage 712 and controlled by the processors 704 executing the computer program instructions. An image acquisition device 720, such as a CT scanning device or MRI scanning device, can be connected to the computer 702 to input image data to the computer 702. It is possible to implement the image acquisition device 720 and the computer 702 as one device. It is also possible that the image acquisition device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.). One skilled in the art will recognize that an implementation of an actual computer could contain other components as well, and that FIG. 7 is a high level representation of some of the components of such a computer for illustrative purposes.

The above-described methods for streaming-optimized volume rendering may be implemented on a cloud-based computing system, a server, or another computing device that is connected to a network and communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. Certain steps of the method of FIG. 2, may be performed by a server or by another computing device in a network-based cloud-computing system. Certain steps of the method of FIG. 2, may be performed locally by a client computer in a network-based cloud computing system.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for streaming-optimized volume rendering of a 3D medical volume, comprising:
    setting view parameters for a 2D projection of the 3D medical volume based on a received user input;
    determining respective optimal rendering parameters for each of a plurality of rendering stages; and
    generating output 2D projection images corresponding to the view parameters in each of the plurality of rendering stages by:
        performing, by each of one or more rendering contexts, one or more rendering passes of a progressive volume rendering algorithm on the 3D volume, to generate a respective rendered image, and
        compositing, by a display context, the rendered images generated by the one or more rendering contexts,
    wherein in each respective one of the plurality of rendering stages, the one or more rendering contexts and the display context are configured using the respective optimal rendering parameters determined for that rendering stage, wherein the plurality of rendering stages include an interaction stage, a visual quality refinement stage, and a final assessment stage, and wherein determining respective optimal rendering parameters for each of a plurality of rendering stages comprises:
    setting the optimal rendering parameters for the final assessment stage to configure the one or more rendering contexts to each perform a plurality of rendering passes of the progressive rendering algorithm per each refinement of the output 2D projection image and to reduce a frequency of memory transfers between the rendering contexts and the display context.

2. The method of claim 1, wherein determining respective optimal rendering parameters for each of a plurality of rendering stages further comprises:
    setting the optimal rendering parameters for the interaction stage to configure the one or more rendering contexts to generate the respective rendered images at a reduced resolution, and to configure the one or more rendering contexts to each perform a plurality of rendering passes of the progressive rendering algorithm.

3. The method of claim 1, wherein determining respective optimal rendering parameters for each of a plurality of rendering stages further comprises:
    determining the optimal rendering parameters for the interaction stage by automatically varying at least one of a resolution of the rendered images generated by the one or more rendering contexts or a number of rendering passes performed by each of the one or more rendering contexts to achieve a target framerate for streaming the output 2D projections images.

4. The method of claim 1, wherein determining respective optimal rendering parameters for each of a plurality of rendering stages further comprises:
    determining, based on an available memory bandwidth between the display context and the one or more rendering contexts, an optimal subset of a plurality of graphic processor units (GPUs) to dedicate to the rendering contexts to perform the one or more rendering passes of the progressive rendering algorithm on the 3D volume in the interaction stage, wherein each one of the subset of the plurality of GPUs is dedicated to a respective one of the one or more rendering contexts.

5. The method of claim 1, wherein determining respective optimal rendering parameters for each of a plurality of rendering stages further comprises:
    setting the optimal rendering parameters for the interaction stage to employ throttling on a GPU that is shared by a rendering context and the display context.

6. The method of claim 5, wherein determining respective optimal rendering parameters for each of a plurality of rendering stages further comprises:
    setting the optimal rendering parameters for the visual quality refinement stage to reduce throttling on the GPU that is shared by the rendering context and the display context.

7. The method of claim 1, wherein determining respective optimal rendering parameters for each of a plurality of rendering stages further comprises:
    setting the optimal rendering parameters for the interaction stage to configure the one or more rendering contexts to each perform a plurality of rendering passes of the progressive rendering algorithm before the resulting rendered images are composited by the display context; and
    setting the optimal rendering parameters for the visual quality refinement stage to configure the one or more rendering contexts to each perform a single rendering pass of the progressive rendering algorithm before the resulting rendered images are composited by the display context.

8. The method of claim 1, wherein determining respective optimal rendering parameters for each of a plurality of rendering stages further comprises:
    setting the optimal rendering parameters for the visual quality refinement stage to configure the one or more rendering contexts to each perform a single rendering pass of the progressive rendering algorithm per each refinement of the output 2D projection image, and to configure the display context to interact with only a single rendering context per each display pass by the display context.

9. The method of claim 1, wherein setting the optimal rendering parameters for the final assessment stage to configure the one or more rendering contexts to each perform a plurality of rendering passes of the progressive rendering algorithm per each refinement of the output 2D projection image and to reduce a frequency of memory transfers between the rendering contexts and the display context comprises:
    automatically adapting the frequency of memory transfers between the rendering contexts and the display context until a memory transfer cost does not affect a computational throughput of the volume rendering above a specified threshold.

10. The method of claim 1, wherein setting the optimal rendering parameters for the final assessment stage to configure the one or more rendering contexts to each perform a plurality of rendering passes of the progressive rendering algorithm per each refinement of the output 2D projection image and to reduce a frequency of memory transfers between the rendering contexts and the display context comprises:
    setting the frequency of memory transfers between the rendering contexts and the display context to a fraction of a display pass frequency and configuring the display context to interact with no more than one rendering context per display pass.

11. The method of claim 1, further comprising:
displaying the output 2D projection images.

12. The method of claim 1, further comprising:
encoding the output 2D projection images; and
streaming the encoded output 2D projection images to a remote terminal.

13. The method of claim 1, wherein performing, by each of one or more rendering contexts, one or more rendering passes of a progressive volume rendering algorithm on the 3D volume, to generate a respective rendered image comprises:
performing, by each of a plurality of rendering contexts, one or more rendering passes of the progressive volume rendering algorithm on the 3D volume, wherein each of the plurality of rendering contexts is deployed on a dedicated one of a respective plurality of graphics processing units (GPUs) running in parallel.

14. An apparatus for streaming-optimized volume rendering of a 3D medical volume, comprising:
means for setting view parameters for a 2D projection of the 3D medical volume based on a received user input;
means for determining respective optimal rendering parameters for each of a plurality of rendering stages; and
means for generating output 2D projection images corresponding to the view parameters in each of the plurality of rendering stages, comprising:
means for performing, by each of one or more rendering contexts, one or more rendering passes of a progressive volume rendering algorithm on the 3D volume, to generate a respective rendered image, and
means for compositing, by a display context, the rendered images generated by the one or more rendering contexts,
wherein in each respective one of the plurality of rendering stages, the one or more rendering contexts and the display context are configured using the respective optimal rendering parameters determined for that rendering stage, wherein the plurality of rendering stages include an interaction stage, a visual quality refinement stage, and a final assessment stage, and wherein the means for determining respective optimal rendering parameters for each of a plurality of rendering stages comprises:
means for setting the optimal rendering parameters for the final assessment stage to configure the one or more rendering contexts to each perform a plurality of rendering passes of the progressive rendering algorithm per each refinement of the output 2D projection image and to reduce a frequency of memory transfers between the rendering contexts and the display context.

15. The apparatus of claim 14, wherein the means for determining respective optimal rendering parameters for each of a plurality of rendering stages further comprises:
means for setting the optimal rendering parameters for the interaction stage to configure the one or more rendering contexts to generate the respective rendered images at a reduced resolution, and to configure the one or more rendering contexts to each perform a plurality of rendering passes of the progressive rendering algorithm.

16. The apparatus of claim 14, wherein the means for determining respective optimal rendering parameters for each of a plurality of rendering stages further comprises:
means for determining the optimal rendering parameters for the interaction stage by automatically varying at least one of a resolution of the rendered images generated by the one or more rendering contexts or a number of rendering passes performed by each of the one or more rendering contexts to achieve a target framerate for streaming the output 2D projections images.

17. The apparatus of claim 14, wherein the means for determining respective optimal rendering parameters for each of a plurality of rendering stages further comprises:
means for setting the optimal rendering parameters for the interaction stage to configure the one or more rendering contexts to each perform a plurality of rendering passes of the progressive rendering algorithm before the resulting rendered images are composited by the display context; and
means for setting the optimal rendering parameters for the visual quality refinement stage to configure the one or more rendering contexts to each perform a single rendering pass of the progressive rendering algorithm before the resulting rendered images are composited by the display context.

18. The apparatus of claim 14, wherein the means for determining respective optimal rendering parameters for each of a plurality of rendering stages further comprises:
means for setting the optimal rendering parameters for the visual quality refinement stage to configure the one or more rendering contexts to each perform a single rendering pass of the progressive rendering algorithm per each refinement of the output 2D projection image, and to configure the display context to interact with only a single rendering context per each display pass by the display context.

19. The apparatus of claim 14, further comprising:
means for displaying the output 2D projection images.

20. The apparatus of claim 14, further comprising:
means for encoding the output 2D projection images; and
means for streaming the encoded output 2D projection images to a remote terminal.

21. A non-transitory computer readable medium storing computer program instructions for streaming-optimized volume rendering of a 3D medical volume, the computer program instructions when executed by a processor cause the processor to perform operations comprising:
setting view parameters for a 2D projection of the 3D medical volume based on a received user input;
determining respective optimal rendering parameters for each of a plurality of rendering stages; and
generating output 2D projection images corresponding to the view parameters in each of the plurality of rendering stages by:
performing, by each of one or more rendering contexts, one or more rendering passes of a progressive volume rendering algorithm on the 3D volume, to generate a respective rendered image, and
compositing, by a display context, the rendered images generated by the one or more rendering contexts,
wherein in each respective one of the plurality of rendering stages, the one or more rendering contexts and the display context are configured using the respective optimal rendering parameters determined for that rendering stage, wherein the plurality of rendering stages include an interaction stage, a visual quality refinement stage, and a final assessment stage, and wherein determining respective optimal rendering parameters for each of a plurality of rendering stages comprises:
setting the optimal rendering parameters for the final assessment stage to configure the one or more rendering contexts to each perform a plurality of rendering passes of the progressive rendering algorithm per each refinement of the output 2D projection image and to reduce a frequency of memory transfers between the rendering contexts and the display context.

22. The non-transitory computer readable medium of claim 21, wherein determining respective optimal rendering parameters for each of a plurality of rendering stages further comprises:
  setting the optimal rendering parameters for the interaction stage to configure the one or more rendering contexts to generate the respective rendered images at a reduced resolution, and to configure the one or more rendering contexts to each perform a plurality of rendering passes of the progressive rendering algorithm.

23. The non-transitory computer readable medium of claim 21, wherein determining respective optimal rendering parameters for each of a plurality of rendering stages further comprises:
  determining the optimal rendering parameters for the interaction stage by automatically varying at least one of a resolution of the rendered images generated by the one or more rendering contexts or a number of rendering passes performed by each of the one or more rendering contexts to achieve a target framerate for streaming the output 2D projections images.

24. The non-transitory computer readable medium of claim 21, wherein determining respective optimal rendering parameters for each of a plurality of rendering stages further comprises:
  setting the optimal rendering parameters for the interaction stage to configure the one or more rendering contexts to each perform a plurality of rendering passes of the progressive rendering algorithm before the resulting rendered images are composited by the display context; and
  setting the optimal rendering parameters for the visual quality refinement stage to configure the one or more rendering contexts to each perform a single rendering pass of the progressive rendering algorithm before the resulting rendered images are composited by the display context.

25. The non-transitory computer readable medium of claim 21, wherein determining respective optimal rendering parameters for each of a plurality of rendering stages further comprises:
  setting the optimal rendering parameters for the visual quality refinement stage to configure the one or more rendering contexts to each perform a single rendering pass of the progressive rendering algorithm per each refinement of the output 2D projection image, and to configure the display context to interact with only a single rendering context per each display pass by the display context.

26. The non-transitory computer readable medium of claim 21, wherein the operations further comprise:
  displaying the output 2D projection images.

27. The non-transitory computer readable medium of claim 21, wherein the operations further comprise:
  encoding the output 2D projection images; and
  streaming the encoded output 2D projection images to a remote terminal.

* * * * *